US012698167B2

(12) United States Patent
Thomas et al.

(10) Patent No.: US 12,698,167 B2
(45) Date of Patent: Aug. 4, 2026

(54) PALLET RETURN ASSEMBLY

(71) Applicant: Walmart Apollo, LLC, Bentonville, AR (US)

(72) Inventors: James P. Thomas, Tomah, WI (US); Jacob A. Vesterfelt, Viola, WI (US)

(73) Assignee: Walmart Apollo, LLC, Bentonville, AR (US)

( * ) Notice: Subject to any disclaimer, the term of this patent is extended or adjusted under 35 U.S.C. 154(b) by 113 days.

(21) Appl. No.: 18/756,933

(22) Filed: Jun. 27, 2024

(65) Prior Publication Data
US 2025/0002275 A1 Jan. 2, 2025

Related U.S. Application Data

(60) Provisional application No. 63/523,845, filed on Jun. 28, 2023.

(51) Int. Cl.
*B65G 57/02* (2006.01)
*B65G 13/00* (2006.01)
*B65G 47/88* (2006.01)

(52) U.S. Cl.
CPC ............. *B65G 57/02* (2013.01); *B65G 13/00* (2013.01); *B65G 47/8815* (2013.01); *B65G 2201/0267* (2013.01)

(58) Field of Classification Search
CPC .......... B65G 13/00–12; B65G 47/8815; B65G 47/8823; B65G 2201/0267
USPC ....................................................... 193/35 G
See application file for complete search history.

(56) References Cited

U.S. PATENT DOCUMENTS

| | | | | |
|---|---|---|---|---|
| 3,199,140 A | * | 8/1965 | Mcknight ............. | E05F 1/1261 |
| | | | | 193/35 G |
| 3,587,876 A | * | 6/1971 | Dahlem et al. ...... | B65G 47/086 |
| | | | | 198/374 |
| 3,675,801 A | * | 7/1972 | Larson ............... | B65G 47/8815 |
| | | | | 414/416.03 |
| 4,027,771 A | * | 6/1977 | Adams ................. | B62B 3/0625 |
| | | | | 280/43.12 |

(Continued)

FOREIGN PATENT DOCUMENTS

| | | |
|---|---|---|
| CA | 2889460 | 11/2015 |

OTHER PUBLICATIONS

Engineered Products; "Gravity Flow Racks & Systems"; <https://engprod.com/gravity-flow-rack>; available at least as early as Apr. 11, 2023; pp. 1-3.

(Continued)

*Primary Examiner* — Joseph A Dillon, Jr.
(74) *Attorney, Agent, or Firm* — Fitch, Even, Tabin & Flannery, LLP

(57) ABSTRACT

A pallet return assembly includes at least one support member, a bracket member, a base member including a stopper member, and a lever that, when actuated, moves the base member and its stopper member from a pallet catch position to a pallet release position. In the pallet catch position, the stopper member catches a bottom of a pallet positioned on the roller tracks of the pallet bay and restricts the pallet from moving along the roller tracks. In the pallet release position, the stopper member no longer catches the bottom of the pallet positioned on the roller tracks and no longer restricts the pallet from moving along the roller tracks.

16 Claims, 12 Drawing Sheets

(56) References Cited

U.S. PATENT DOCUMENTS

| | | | | |
|---|---|---|---|---|
| 5,211,276 | A * | 5/1993 | Clopton | B65G 47/8823 |
| | | | | 198/463.4 |
| 5,647,725 | A * | 7/1997 | Kraus | B65H 1/30 |
| | | | | 414/928 |
| 6,079,939 | A * | 6/2000 | Smets | B65G 59/08 |
| | | | | 198/406 |
| 6,189,672 | B1 * | 2/2001 | Schut | B65G 1/08 |
| | | | | 193/35 G |
| 6,202,821 | B1 * | 3/2001 | Crockett | B65G 13/12 |
| | | | | 198/530 |
| 6,234,292 | B1 * | 5/2001 | Schut | B65G 47/8823 |
| | | | | 198/463.6 |
| 6,439,369 | B1 * | 8/2002 | Brown | B65G 47/647 |
| | | | | 198/531 |
| 6,575,286 | B1 * | 6/2003 | Mills | B65G 47/261 |
| | | | | 193/35 G |
| 7,111,721 | B1 * | 9/2006 | Turner | B65G 47/8823 |
| | | | | 198/463.4 |
| 7,316,305 | B2 * | 1/2008 | Richter | B65G 1/023 |
| | | | | 193/35 R |
| 7,380,649 | B2 * | 6/2008 | Lauyans | B65G 47/8823 |
| | | | | 193/35 A |
| 8,291,837 | B2 * | 10/2012 | Kirkpatrick | B65D 19/0014 |
| | | | | 108/51.11 |
| 9,090,407 | B2 * | 7/2015 | Matsumoto | B65G 43/00 |
| 9,120,630 | B1 | 9/2015 | Hilgendorf | |
| 9,187,248 | B2 * | 11/2015 | Ribau | B65G 47/883 |
| 10,273,093 | B2 * | 4/2019 | Loizeau | B65G 47/8823 |
| 10,995,695 | B1 | 5/2021 | Hilgendorf | |
| 11,814,251 | B1 * | 11/2023 | Maier | B65G 47/8823 |
| 11,897,704 | B2 * | 2/2024 | Dunten | B65G 47/8846 |
| 12,037,203 | B2 * | 7/2024 | Kiyokawa | G01N 21/84 |
| 12,570,482 | B2 * | 3/2026 | Lundgren | B65G 47/8823 |
| 2007/0065268 | A1 | 3/2007 | Clapp | |
| 2007/0221476 | A1 * | 9/2007 | Lauyans | B65G 47/8823 |
| | | | | 198/463.1 |
| 2007/0261934 | A1 * | 11/2007 | Goffredo | B65G 1/023 |
| | | | | 193/37 |
| 2013/0028696 | A1 * | 1/2013 | Peschel | B66F 9/142 |
| | | | | 29/428 |
| 2014/0100999 | A1 | 4/2014 | Mountz | |
| 2020/0339364 | A1 * | 10/2020 | Eckerström | B65G 47/268 |
| 2025/0304382 | A1 * | 10/2025 | Hoskins | B65G 47/8823 |
| 2026/0015185 | A1 * | 1/2026 | Rodríguez Mosquera | |
| | | | | B65G 37/005 |

OTHER PUBLICATIONS

Mallard Manufacturing; "Easy Hold & Lock Device Keeps Pallets in Place in Push-Assisted Pallet Flow"; <https://mallardmfg.com/easy-hold-lock-device-keeps-pallets-in-place-in-push-assisted-pallet-flow/>; available at least as early as Apr. 11, 2023; pp. 1-8.

Mallard Manufacturing; "Empty Pallet Return Lane Systems"; <https://mallardmfg.com/empty-pallet-return-lanes/>; available at least as early as Apr. 11, 2023; pp. 1-6.

Pallet Return Device; "About the Pallet Return Device"; <https://www.palletreturndevice.com/>; available at least as early as Apr. 11, 2023; pp. 1-4.

Thomas Conveyor & Equipment Company, Inc.; "Thomas Conveyor & Equipment Company, Inc."; <https://www.youtube.com/watch?v=Sz3wsqzq5Ok>; Oct. 13, 2020; 8 pages.

* cited by examiner

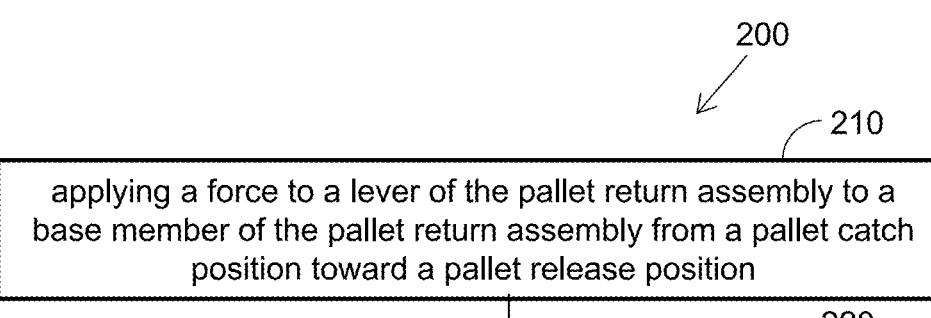

200

210
applying a force to a lever of the pallet return assembly to a base member of the pallet return assembly from a pallet catch position toward a pallet release position 220
applying, when the lever is in the pallet release position, a force to at least one pallet located on roller tracks of a pallet bay, to move the at least one pallet along the roller tracks in a direction away from a first load beam of the pallet bay 240
releasing the force applied to the lever to permit the lever to return to the pallet catch position, where a portion of a stopper member extending from the base member protrudes above a pallet-supporting surface of the roller tracks

PALLET RETURN ASSEMBLY

CROSS-REFERENCE TO RELATED PATENT APPLICATIONS

The present application claims priority to U.S. Provisional Patent Application No. 63/523,845, filed on Jun. 28, 2023, which is incorporated by reference herein in its entirety.

TECHNICAL FIELD

This disclosure relates generally to pallet-supporting assemblies, and in particular, to pallet return assemblies in pallet bays of a product storage facility.

BACKGROUND

Pallet returns (i.e., spaces where workers place pallets after emptying the products from the pallets in a retail storage/distribution center environment) in flow-through racking (racking with rollers that hold two pallets deep) are generally located only in slots where there are single pallet bays. If a double pallet bay is converted to a pallet return, then both slots are typically used as a pallet return due to the positioning of the load beams. However, such use is not efficient, since this uses up storage slots/space that could be used to contain product. In addition, the so-called "catches" (i.e., structures that are used to hold the pallets in place until there are enough pallets in a stack to push them back to where the forklift can remove them) are placed underneath the pallet returns, and are thus not easily visible and are easily accessible by the workers.

BRIEF DESCRIPTION OF THE DRAWINGS

The accompanying drawings, which are incorporated in and constitute a part of this specification, illustrate one or more embodiments of the disclosure and, together with the description, help to explain the disclosure. The drawings are not necessarily drawn to scale, or inclusive of all elements of a system, emphasis instead generally being placed upon illustrating the concepts, structures, and techniques sought to be protected herein. In the drawings:

FIG. 3 is a bottom perspective view of the pallet return assembly of FIG. 1, showing the base member in the pallet catch position;

FIG. 12 is a flow chart illustrating the steps of an exemplary method of using a pallet return assembly according to some embodiments.

DETAILED DESCRIPTION

Figure 1:
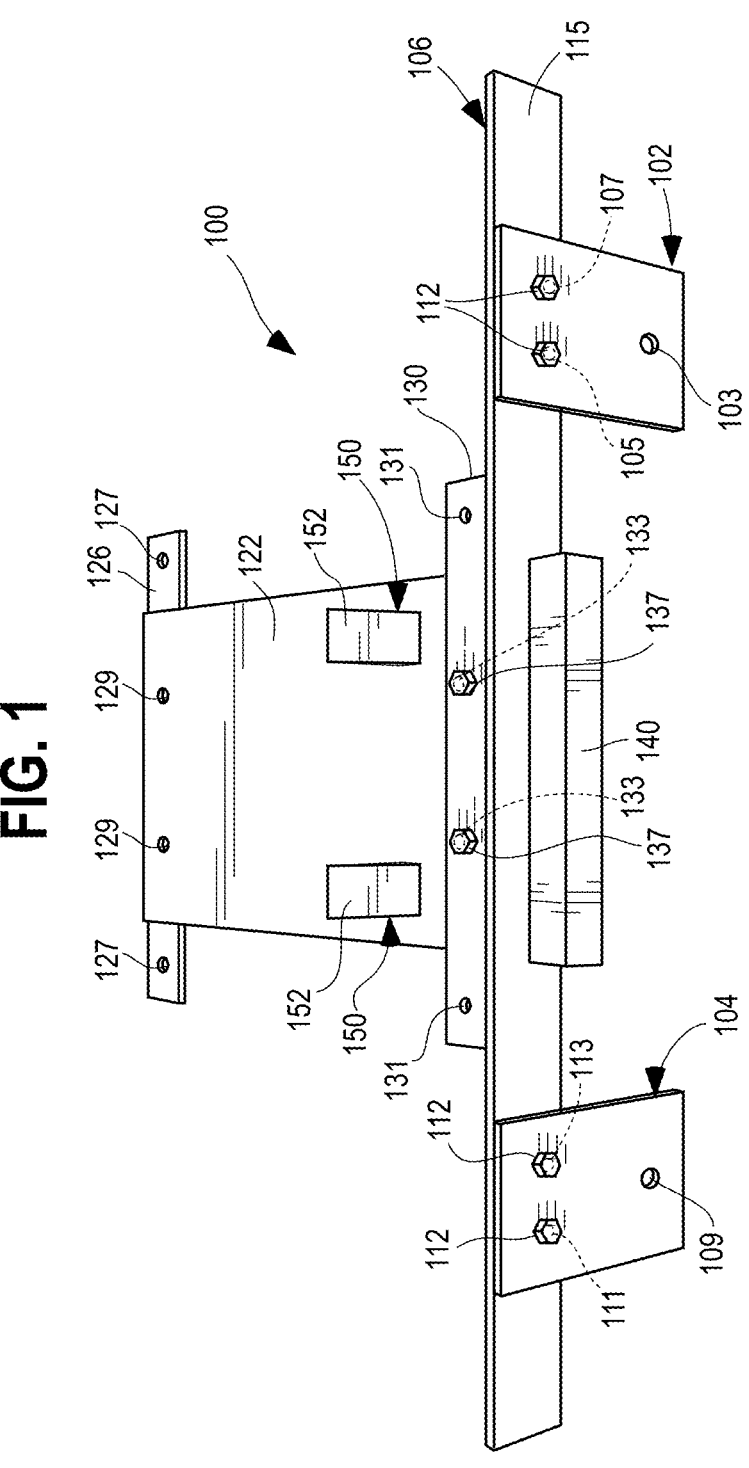
FIG. 1 is a front perspective view of a pallet return assembly in accordance with an exemplary embodiment.

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, a pallet return assembly includes at least one support member, a bracket member, a base member including a stopper member extending generally upwardly therefrom, and a lever that, when actuated, moves the base member and its stopper member from a pallet catch position to a pallet release position. In the pallet catch position, the stopper member extending from the base member catches a bottom of a pallet positioned on the roller tracks of the pallet bay and restricts the pallet from moving along the roller tracks. In the pallet release position, the stopper member extending from the base member no longer catches the bottom of the pallet positioned on the roller tracks and no longer restricts the pallet from moving along the roller tracks.

In some embodiments, a pallet return assembly includes a first support member configured to be attached to a first load beam of a pallet bay; a bracket member configured to be attached to the first support member and to at least one of a plurality of roller tracks of the pallet bay; a base member including a stopper member extending generally upwardly therefrom; and a lever coupled to a portion of the base member and configured to move between a pallet catch position and a pallet release position. When the lever is in the pallet catch position, the base member is positioned such that a portion of the stopper member extending from the base member protrudes above a pallet-supporting surface of the roller tracks of the pallet bay and catches a bottom of a pallet positioned on the roller tracks and restricts the pallet from moving along the roller tracks. When the lever is in the pallet release position, the base member is positioned such that the portion of the stopper member extending from the base member is positioned below the pallet-supporting surface of the roller tracks of the pallet bay and no longer catches the bottom of the pallet positioned on the roller tracks and no longer restricts the pallet from moving along the roller tracks.

In some embodiments, a method of using a pallet return assembly comprises applying a force to a lever of the pallet return assembly to a base member of the pallet return assembly from a pallet catch position toward a pallet release position; applying, when the lever is in the pallet release position, a force to at least one pallet located on roller tracks of a pallet bay, to move the at least one pallet along the roller tracks in a direction away from a first load beam of the pallet bay; and releasing the force applied to the lever to permit the lever to return to the pallet catch position, where a portion of a stopper member extending from the base member protrudes above a pallet-supporting surface of the roller tracks.

FIG. 1 shows an embodiment of a pallet return assembly 100. In the illustrated embodiments, the pallet return assembly 100 is attached to roller tracks 180 of a pallet bay 190, but it will be appreciated that, in some embodiments, the pallet return assembly 100 may be attached to one or more frame members (e.g., load beams or other support members) of the pallet bay 190. The pallet return assembly 100 shown in FIG. 1 includes a first support member 102 and a second support member 104 spaced apart from the first support member 102, as well as a bracket member 106 attached to and interconnecting the first and second support members 102, 104 In some embodiments, the first support member 102, second support member 104, and bracket member 106 are made of steel, but it will be appreciated that they could be made of other suitable materials. Notably, in some embodiments, the pallet return assembly 100 may include only the first support member 102 without the second support member 104.

In the illustrated embodiment, the first support member 102 has a generally rectangular overall shape and is oriented generally vertically (i.e., with the longer side of the rectangle being oriented vertically and the shorter side of the rectangle being oriented horizontally) and includes a lower opening 103 and two upper openings 105, 107. Similarly, the second support member 104 has a generally rectangular overall shape and is oriented generally vertically (i.e., with the longer side of the rectangle being oriented vertically and the shorter side of the rectangle being oriented horizontally) and includes a lower opening 109 and two upper openings 111, 113.

In some embodiments, the lower openings 103 and 109 of the first and second support members 102 and 104, respectively, permit fasteners 108, 110 to pass therethrough, respectively, to attach the first and second support members 102, 104 to a first load beam 192 of the pallet bay 190. On the other hand, the upper openings 105, 107 and 111, 113 of the first and second support members 102, 104, respectively, permit fasteners 112 to pass therethrough, respectively, to attach the first and second support members 102, 104 to the bracket member 106. While the exemplary first and second support members 102 and 104 each have one lower opening 103 and 109, respectively, it will be appreciated that, in some embodiments, the first and second support members 102 and 104 may each include two lower openings 103, 109. Similarly, while the exemplary first and second support members 102 and 104 each have two upper openings 105, 107 and 111, 113, it will be appreciated that, in some embodiments, the first and second support members 102 and 104 may each include only one upper opening.

In some embodiments, each of the first and second support members 102, 104 has a length of about 8 inches and a width of about 5 inches, while the lower openings 103 and 109, as well as the upper openings 105, 107, 111, and 113 have a diameter of about $\frac{9}{16}^{th}$ of an inch. It will be appreciated, however, that these dimensions are provided by way of example only, and that the first and second support members 102, 104, as well as the openings therein, may have different dimensions in other embodiments of the pallet return assembly 100.

In the illustrated embodiment, the bracket member 106 of the pallet return assembly 100 is L-shaped such that the bracket member 106 includes a vertical portion 115 and a horizontal portion 117. The exemplary vertical portion 115 of the bracket member 106 includes multiple openings 118 that permit the vertical portion 115 of the bracket member 106 to be attached via the fasteners 112 to the first and second support members 102, 104 of the pallet return assembly 100. In the illustrated embodiment, the vertical portion 115 of the bracket member 106 includes two pairs of openings 118 (i.e., 4 openings in total) that permit fasteners 112 to pass therethrough to attach the vertical portion 115 of the bracket member 106 to the first and second support members 102, 104 (i.e., with two fasteners 112 passing through a first pair of openings 118 of the vertical portion 115 to attach the vertical portion 115 to the first support member 102 and two fasteners 112 passing through a second pair of openings 118 of the vertical portion 115 to attach the vertical portion 115 to the second support member 104). It will be appreciated that, in some embodiments, instead of being attached to each of the first and second support members 102, 104 via a pair of fasteners 112 passing through a pair of openings 118, the vertical portion 115 of the bracket member 106 may include two openings 118 that each permit one fastener 112 (i.e., two fasteners total) to pass therethrough to attach the vertical portion 115 of the bracket member 106 to the first and second support members 102, 104.

Figure 6:
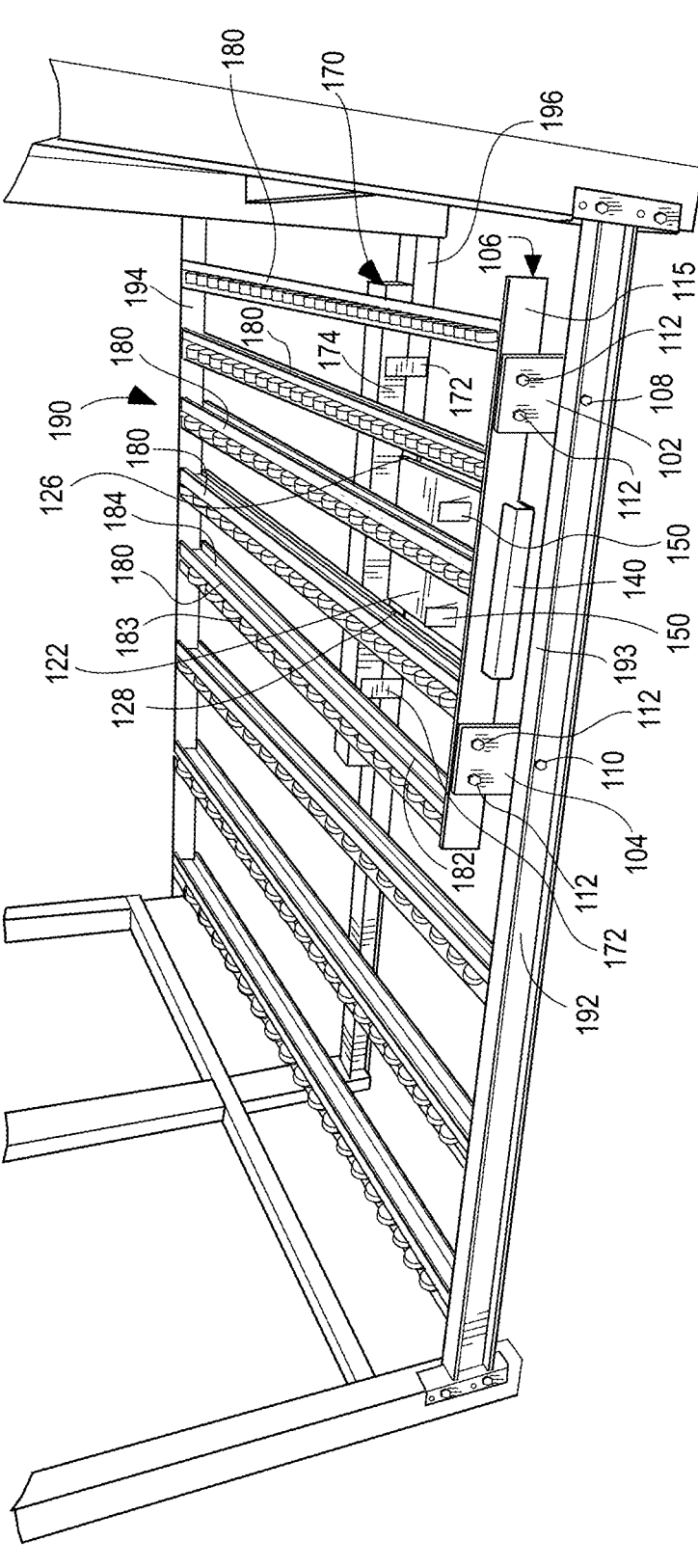
FIG. 6 is a front perspective view of a pallet return assembly in accordance with an exemplary embodiment installed in a pallet bay.

In the illustrated embodiment, the horizontal portion 117 of the bracket member 106 includes multiple openings 120 that permit the horizontal portion 117 of the bracket member 106 to be attached to one or more roller tracks 180 of the pallet bay 190. In particular, the horizontal portion 117 of the exemplary bracket member 106 includes five pairs of openings 120 (i.e., 10 in total) each permitting a fastener 121 to pass therethrough to attach the horizontal portion 117 of the bracket member 106 to five roller tracks 180 of a pallet bay 190 as shown in FIG. 6.

In some embodiments, the horizontal portion 117 of the bracket member 106 is positioned above a top surface 193 of the first load beam 192 of the pallet bay 190 such that the roller tracks 180 attached to the horizontal portion 117 of the bracket member 106 are tilted. In particular, the roller tracks 180 attached to the horizontal portion 117 of the bracket member 106 are tilted (see, e.g., FIGS. 4-6) such that a first end portion 182 of the roller tracks 180, which is attached to the horizontal portion 117 of the bracket member 106, is positioned higher than a second end portion 184 of the roller tracks 180, which is located opposite to the first end portion 182 of the roller tracks 180 and is attached to a second load beam 194 of the pallet bay 190, the second load beam 194 being located opposite the first load beam 192 of the pallet bay 190.

It will be appreciated that instead of including five pairs of openings 120 (i.e., 10 openings in total) that permit five pairs of fasteners 121 to pass therethrough to attach the horizontal portion 117 of the bracket member 106 to five individual roller tracks 180, the horizontal portion 117 of the bracket member 106 may include five openings 120 (i.e., 5 openings in total) that permit a fastener 121 to pass therethrough (i.e., five fasteners 121 in total) to attach the horizontal portion 117 of the bracket member 106 to five roller tracks 180. It will also be appreciated that instead of being attached to the individual roller tracks 180 located in the pallet bay 190, the horizontal portion 117 of the bracket member 106 may be attached by one or more fasteners 121 to a load beam or another suitable support structure of the pallet bay 190.

In some embodiments, the bracket member 106 has a length of about 40 inches, the diameter of the openings 118 is about $11/16^{th}$ of an inch, and the diameter of the openings 120 is about $5/16^{th}$ of an inch. It will be appreciated, however, that these dimensions are provided by way of example only, and that the bracket member 106 may have a different length and may have openings having different diameters in other embodiments of the pallet return assembly 100.

Figure 7:
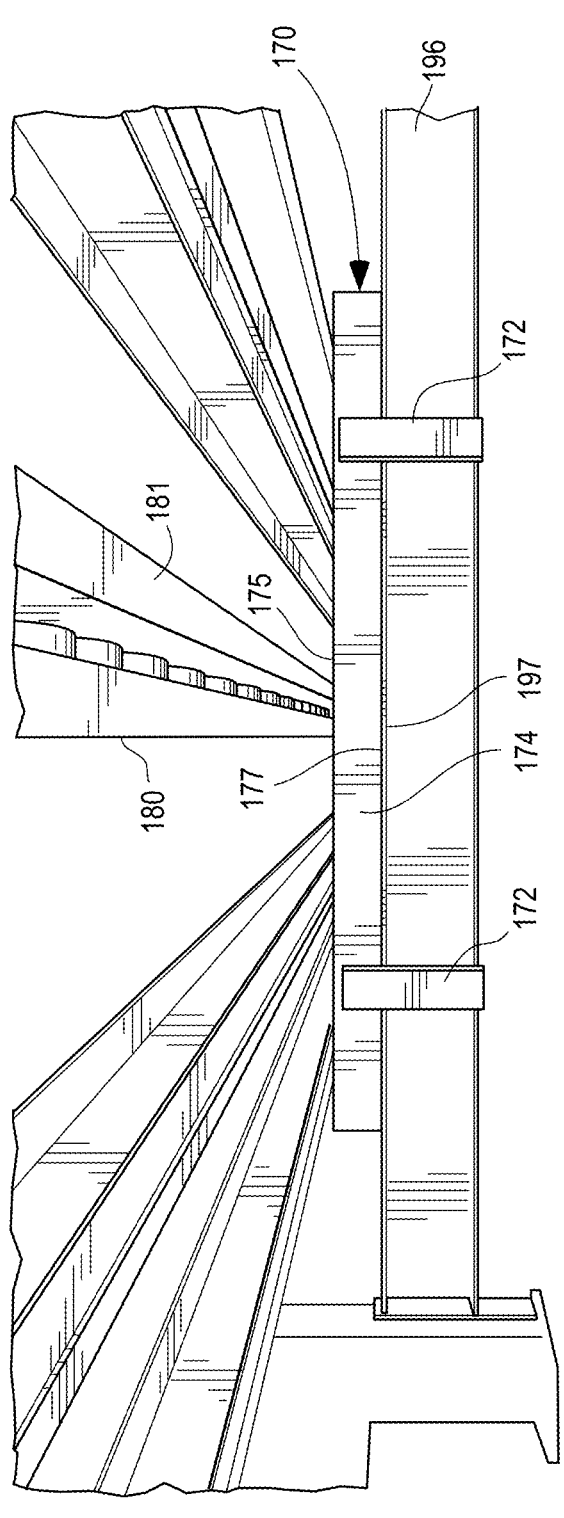
FIG. 7 is a front elevational view of the pallet return assembly of FIG. 6, showing a spacer configured to support the roller tracks of the pallet bay in accordance with an exemplary embodiment.

With reference to FIG. 7, the pallet return assembly may include a spacer 170 that is configured to support the roller tracks 180 of the pallet bay 190 thereon. In the embodiment shown in FIG. 7, the spacer 170 is positioned below the roller tracks 180 such that a top surface 175 of the spacer 170 supports the bottom-facing surface 181 of the roller tracks 180. The exemplary spacer 170 shown in FIG. 7 includes two pairs of vertical support members 172 (which may be replaced by two vertical support members 172 in some embodiments) coupled to a horizontal support member 174 having a length sufficient to simultaneously support the bottom-facing surface 181 of each (in this example, all five) of the roller tracks 180 of the pallet return assembly 100 in the pallet bay 190.

In some aspects, the horizontal support member 174 sits on (and is attached to) the top of the vertical support members 172 and is supported by the top portions of the vertical support members 172. In other embodiments, top portions of the vertical support members 172 extend along at least a portion of the height of the horizontal support member 174 such that such the horizontal support member 174 is sandwiched between the top portions of the vertical support members 172.

In some embodiments, the vertical support members 172 are made of a metal such as steel (other metals may be used) and have a height of about 8 inches. In other embodiments, the vertical support members 172 have a height of about 10.5 inches. In some embodiments, the horizontal support member 174 is made of a metal such as steel (other metals may be used) and has a height of about 2.5 inches and a depth of about 1.5 inches. It will be appreciated, however, that these dimensions are provided by way of example only, and that the vertical support members 172 and horizontal support member 174 of the spacer 170 may have different dimensions in other embodiments of the pallet return assembly 100.

As illustrated, the horizontal support member 174 of the spacer 170 is positioned such that a bottom surface 177 of the spacer 170 is positioned on and at least in part supported by a top surface 197 of the third load beam 196 of the pallet bay 190 that is located between the first load beam 192 of the pallet bay 190 and the second load beam 194 of the pallet bay 190. It will be appreciated, however, that in some embodiments, the spacer 170 may be positioned such that the horizontal support member 174 may not be positioned on the third load beam 196 of the pallet bay 190 and may instead be positioned adjacent the third load beam 196 of the pallet bay 190, such that no portion of the spacer 170 is supported by the third load beam 196.

With reference back to FIGS. 1-3, the exemplary pallet return assembly 100 includes a base member 122 (which may be also referred to herein as a "plate" or "movable plate") including two openings 123 therein. The exemplary illustrated base member 122 is generally rectangular and is made of a metal such as steel, but it will be appreciated that the base member 122 may be of a different overall (geometric or non-geometric) shape and may be made of other suitable materials. In some embodiments, the base member 122 has a length of about 22 inches and a width of about 12 inches, and the openings 123 have a diameter of about $9/16^{th}$ of an inch. It will be appreciated, however, that these dimensions are provided by way of example only, and that the base member 122 may have different dimensions in other embodiments of the assembly 100. While the illustrated exemplary base member 122 has a generally plate-like form, the base member 122 may have a different construction (e.g., arm, bar, or the like) in some embodiments.

Figure 2:
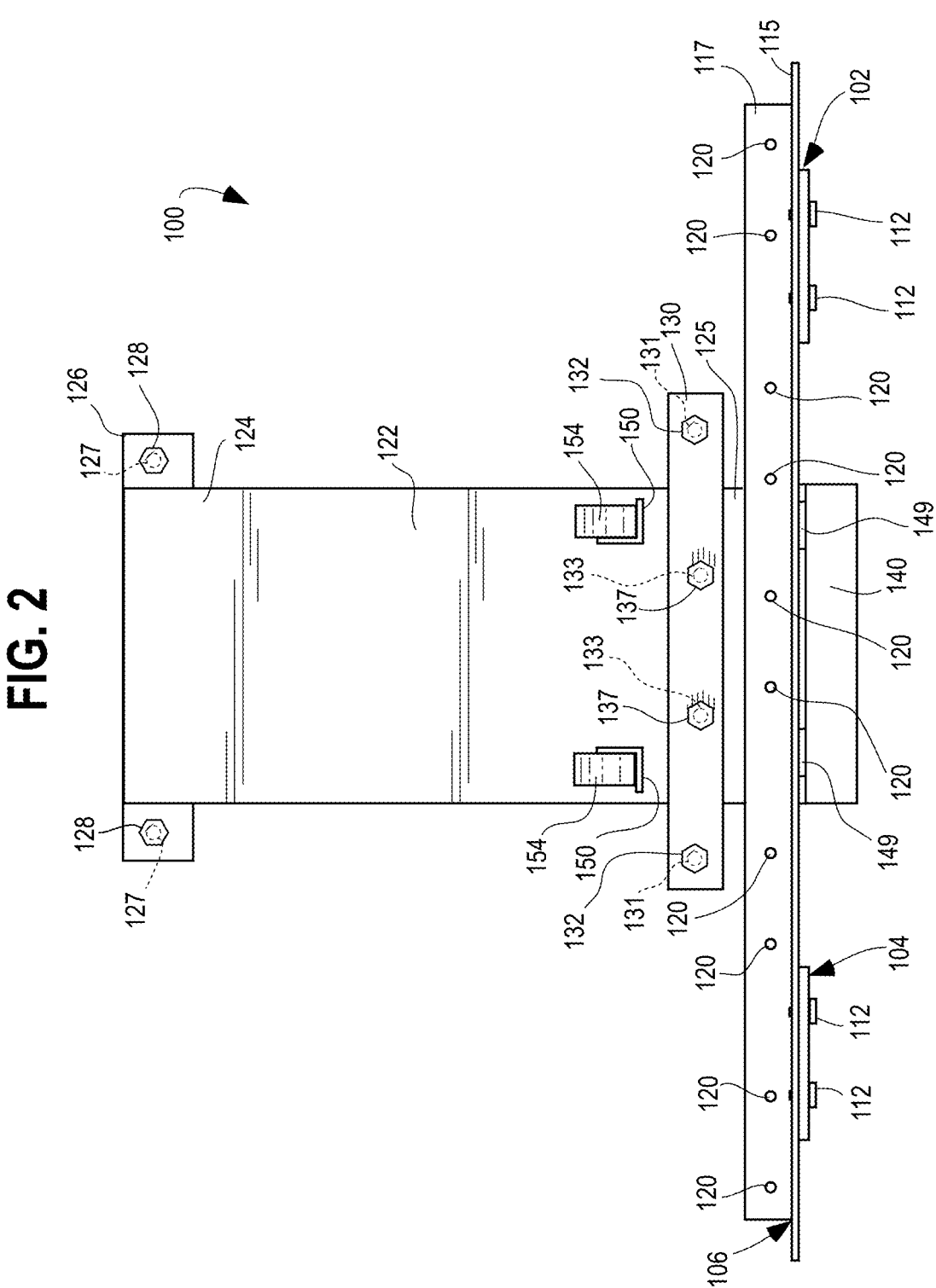
FIG. 2 is a top view of the pallet return assembly of FIG. 1.

In the illustrated embodiment, the base member 122 has two stopper members 150 (which may be referred to herein alternatively as "stoppers") extending upwardly therefrom, but it will be appreciated that one stopper member 150 may be used instead of two stopper members 150 in some embodiments. The exemplary stopper members 150 are generally L-shaped when seen from a top view as shown in FIG. 2. Each stopper member 150 has a front-facing side, which is visible in FIG. 1, which may have a height (i.e., from the upwardly-facing surface of the base member 122 to the top edge of the stopper member 150) of about 4 inches, and a width of about 1.5 inches. The side-facing side of the stopper member 150, which is not visible in FIG. 1, but visible in FIG. 4, may have a width of about 1.5 inches. It will be appreciated, however, that these dimensions are provided by way of example only, and that the stopper members 150 may have different dimensions in other embodiments of the assembly 100.

The exemplary base member 122 has a first end portion 124 and a second end portion 125 opposite the first end portion 124. In the illustrated embodiment, the first end portion 124 of the base member 122 is attached to two roller tracks 180 of the pallet bay 190. In particular, the first end portion 124 of the base member 122 is attached to two roller tracks 180 of the pallet bay 190 indirectly via a first connecting member 126 (which may also be referred to herein as a "first intermediate plate") that includes a pair of (or, in some aspects, more) openings 127 therein that each permit a fastener 128 to pass therethrough and attach the first connecting member 126 to two (or, in some embodiments, more) roller tracks 180 of the pallet bay 190. As will be discussed in more detail below, the first end portion 124 of the base member 122 is fixedly attached (i.e., with the intention of not being movable) via the first connecting member 126 and the fasteners 128 relative to the roller tracks 180 of the pallet bay 190.

It will be appreciated that, in some embodiments, instead of being indirectly attached to the roller tracks 180 of the pallet bay 190 via the first connecting member 126, the base member 122 may include one or more of its own openings that would permit one or more fasteners 128 to pass therethrough and directly attach the base member 122 to the roller tracks 180 (or, as mentioned above, to one or more load beams or other suitable support structures of the pallet bay 190). In addition, it will be appreciated that the first connecting member 126 and the base member 122 do not have to be attached to each other via fasteners 128 and may be attached to each other via any suitable means. For example, the first connecting member 126 may be attached to the base member 122 via fasteners 129, which may be self-tapping screws that are screwed into both the base member 122 and the first connecting member 126 to create openings therein, or which may be bolts that pass through threaded or unthreaded holes that are pre-made in the base member 122 and the first connecting member 126. In another example, the first connecting member 126 may be attached to the base member 122 without fasteners, but via welding as shown in FIG. 2.

In the illustrated embodiment, the first end portion 124 of the base member 122 overlays a portion of the first connecting member 126, but it will be appreciated that, in some embodiments, the first end portion 124 of the base member 122 may underlay a portion of the first connecting member 126. Also, in the illustrated embodiment, portions of the first connecting member 126 that include the openings 127 underlie portions of the roller tracks 180 to which they are attached via the fasteners 128, but it will be appreciated that, in some embodiments, the portions of the first connecting member 126 that include the openings 127 may overlie the portions of the roller tracks 180 to which they are attached via the fasteners 128.

The exemplary illustrated first connecting member 126 is generally rectangular and is made of a metal such as steel, but it will be appreciated that the first connecting member 126 may be of a different overall (geometric or non-geometric) shape and may be made of other suitable materials. In some embodiments, the first connecting member 126 has a length of about 18 inches, a width of about 2 inches, and a thickness of about $3/16^{th}$ inches, and the openings 127 have a diameter of about $7/16^{th}$ of an inch. It will be appreciated, however, that these dimensions are provided by way of example only, and that the first connecting member 126 may have different dimensions in other embodiments of the pallet return assembly 100.

In the illustrated embodiment, the second end portion 125 of the base member 122 is indirectly attached, via a second connecting member 130, to the same two roller tracks 180 of the pallet bay 190 that the first end portion 124 of the base member 122 is attached to. The exemplary illustrated second connecting member 130, which may be referred to herein as a "second intermediate plate," includes a first pair of (or, in some aspects, more) openings 131 therein that each permit a fastener 132 to pass therethrough and attach the second connecting member 130 to two (or, in some aspects, more) roller tracks 180 of the pallet bay 190. As will be discussed in more detail below, the second end portion 125 of the base member 122 is movably coupled (i.e., with the intention of being movable) relative to the roller tracks 180 of the pallet bay 190. In addition, the second connecting member 130 includes a second pair of (or, in some aspects, less (e.g., one) or more (e.g., three or more)) openings 133 therein that each permit a fastener 137 to pass therethrough and to also pass through the complementary openings 123 in the second end portion 125 of the base member 122 (with the openings 123 being generally colinear and/or concentric with the openings 133 to permit each respective fastener 137 to pass through its respective opening 123 and opening 133).

The exemplary illustrated second connecting member 130 is generally rectangular and is made of a metal such as steel, but it will be appreciated that the second connecting member 130 may be of a different overall (geometric or non-geometric) shape and may be made of other suitable materials. In some embodiments, the second connecting member 130 has a length of about 18 inches, a width of about 2 inches, and a thickness of about $3/16^{th}$ inches, and the openings 131 have a diameter of about $7/16^{th}$ of an inch. It will be appreciated, however, that these dimensions are provided by way of example only, and that the second connecting member 130 may have different dimensions in other embodiments of the pallet return assembly 100.

Figure 3:
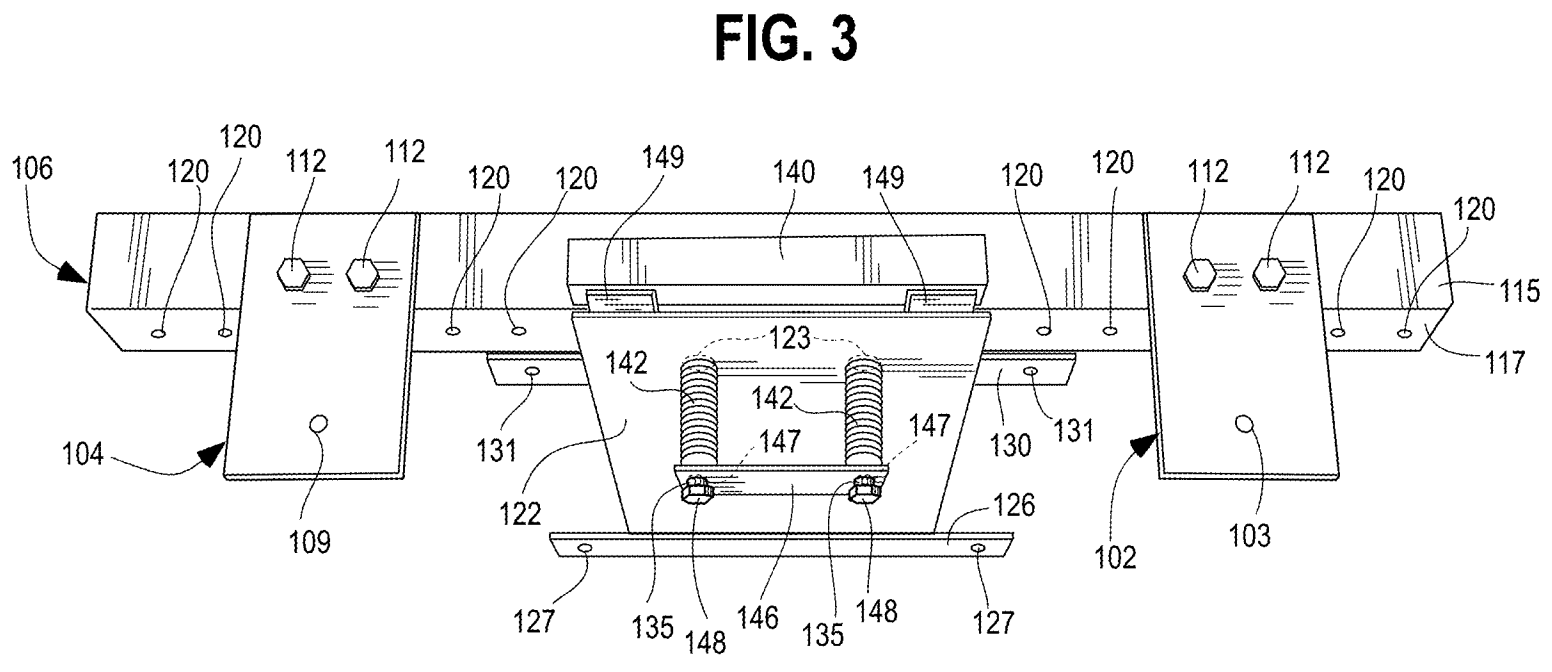

In the embodiment shown in FIG. 3, the base member 122 is retained in the pallet catch position via a biasing force provided by one or more resilient members 142 (which may be, springs or the like) located below the base member 122. In some aspects, the resilient members 142 may be coupled to the fasteners 137 that pass through the openings 133 of the second connecting member 130 and openings 123 of the second end portion 125 of the base member 122. For example, each resilient member 142 may be a spring coupled to a respective one of the fasteners 137 such each resilient member 142 is wrapped around a shaft 139 of a fastener 137.

In one embodiment, a first washer 143 may be coupled to each of the fasteners 137 above their respective resilient member 142 and a second washer 144 may be coupled to each of the fasteners 137 below their respective resilient member 142, with the shaft 139 of the fastener 137 passing through each of the washers 143 and 144. In one aspect, each fastener 137 may pass through an opening 147 of a third connecting member 146 (also referred to herein as "a third intermediate plate"), with a distal end 135 of the shaft 139 of each of the fasteners 137 being attached to the third connecting member 146 via a nut 148 that is located below the third connecting member 146. It will be appreciated that, in some embodiments, the distal end 135 of the shaft 139 of each of the fasteners 137 may be attached to the third connecting member 146 not via a nut 148, but via suitable alternative means (e.g. welding, etc.).

Figure 4:
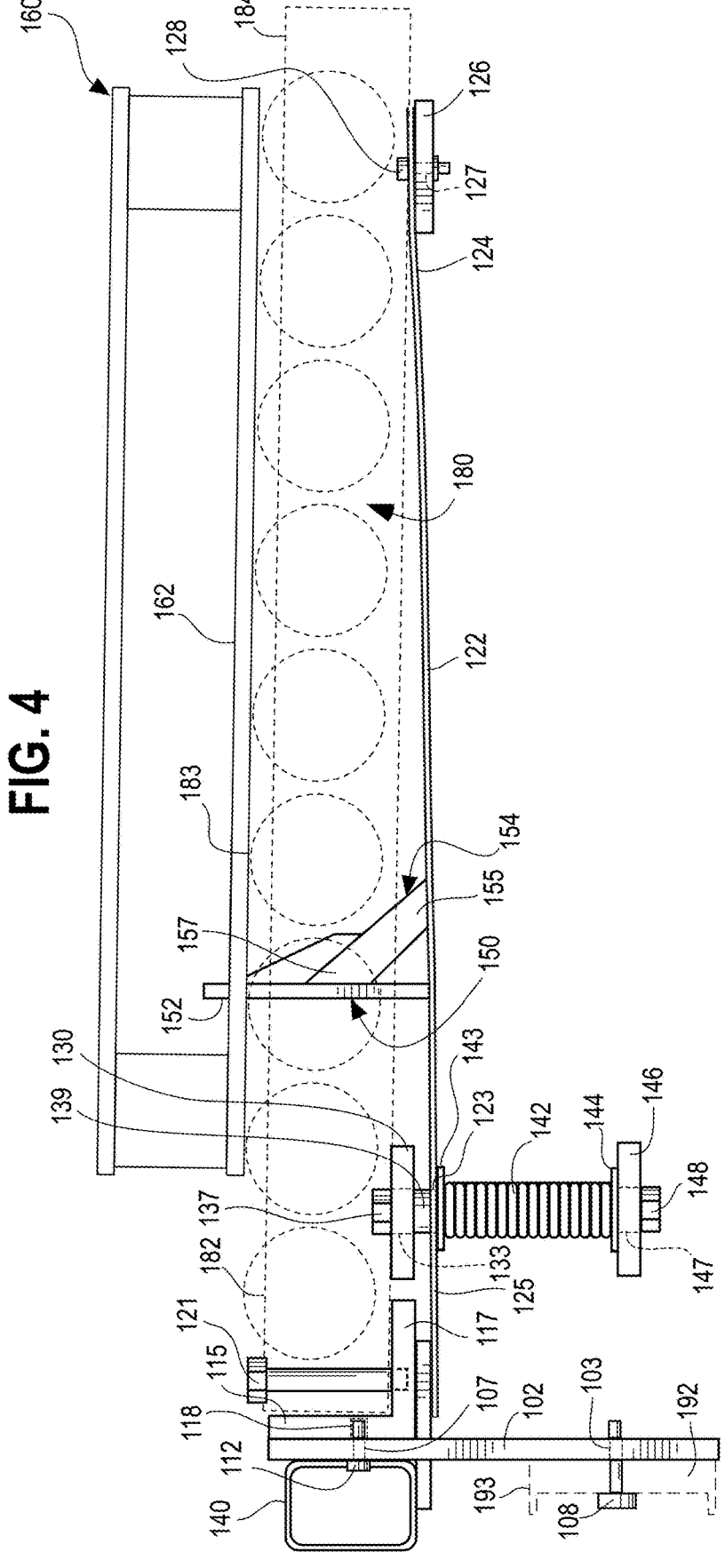
FIG. 4 is a side elevational view of the pallet return assembly of FIG. 3, showing a pallet being positioned on the pallet return assembly such that the pallet is restricted from moving along the roller tracks of the pallet return assembly.
Figure 5:
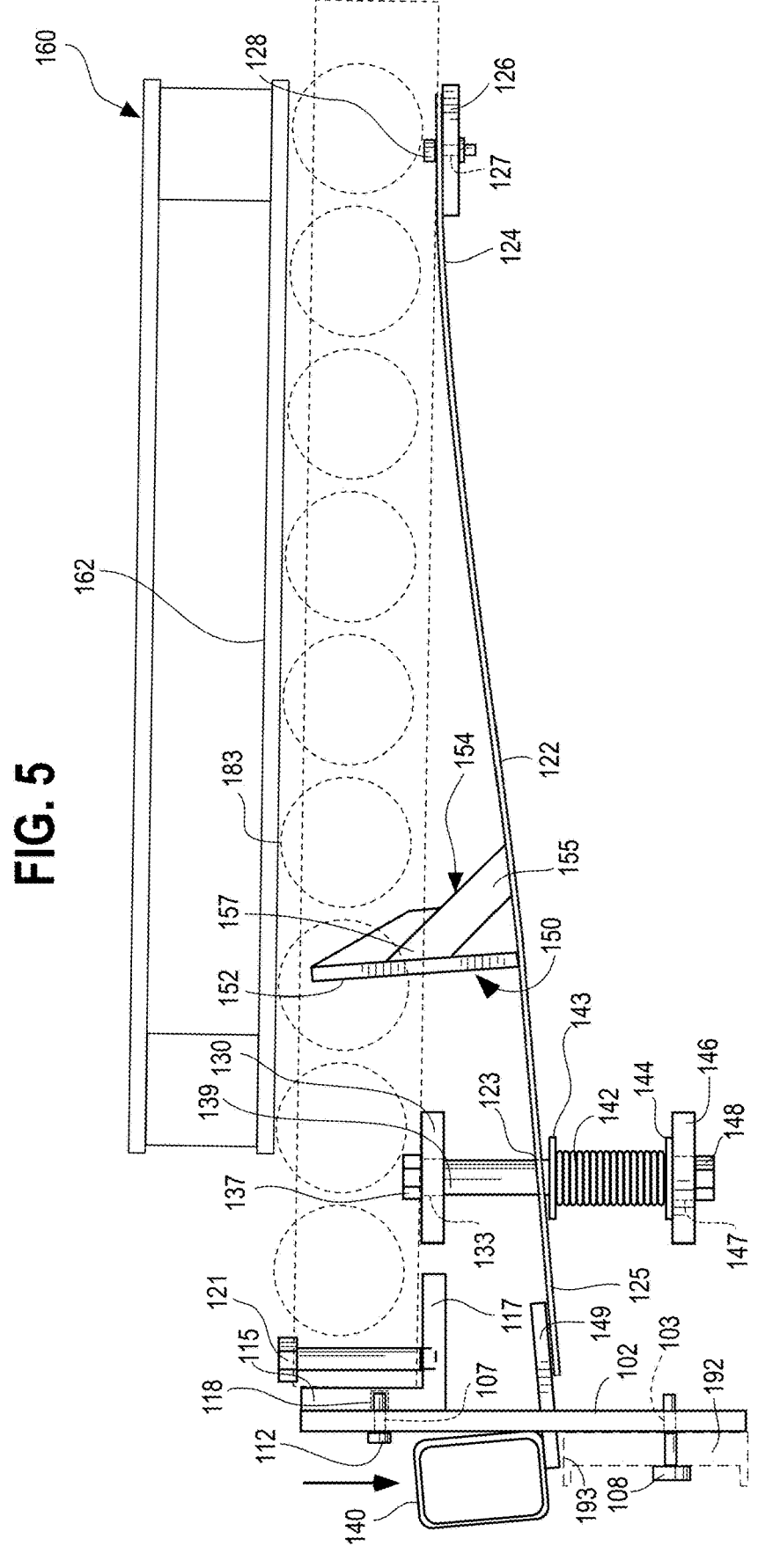
FIG. 5 is a side elevational view of the pallet return assembly of FIG. 3, showing the base member in the pallet release position, and showing a pallet being positioned on the pallet return assembly such that the pallet is permitted to move along the roller tracks of the pallet return assembly.

In some embodiments, the second end portion 125 of the base member 122 is permitted to move, via an operator's (e.g., worker's) actuation of a lever 140, which may be located at a height that permits the operator to step (e.g., with a foot), on the lever 140 from above to cause the lever 140 to move between a pallet catch position shown in FIG. 4 and a pallet release position shown in FIG. 5. As will be discussed in more detail with reference to FIGS. 8 and 9, in some aspects, the entire lever 140 is located above a top surface 193 of the first load beam 192 of the pallet bay 190 both when the lever 140 is in the pallet catch position (see FIGS. 4 and 8) and when the lever 140 is in the pallet release position (see FIGS. 5 and 9).

This location of the lever 140 above the top surface 193 of the first load beam 192 is advantageous at least in that the lever 140 is easily visible to the worker, as opposed to a lever that may be located under the bottom surface of the first load beam 192, which may require the worker to blindly move the worker's foot under the first load beam 192 in an attempt to try to figure out where the lever is located. In the embodiment shown in FIGS. 4 and 5, the second portion 125 of the base member 122 is attached to the lever 140 via a fourth connecting member 149 (also referred to herein as a "fourth connecting plate") such that the fourth connecting member 149 partially underlies the lever 140 and partially overlies the second portion 125 of the base member 122. It will be appreciated that the fourth connecting member 149 may be attached to each of the lever 140 and or the second portion 125 of the base member 122 via welding (as shown in FIG. 4), fasteners, and/or other suitable attachment means.

Figure 9:
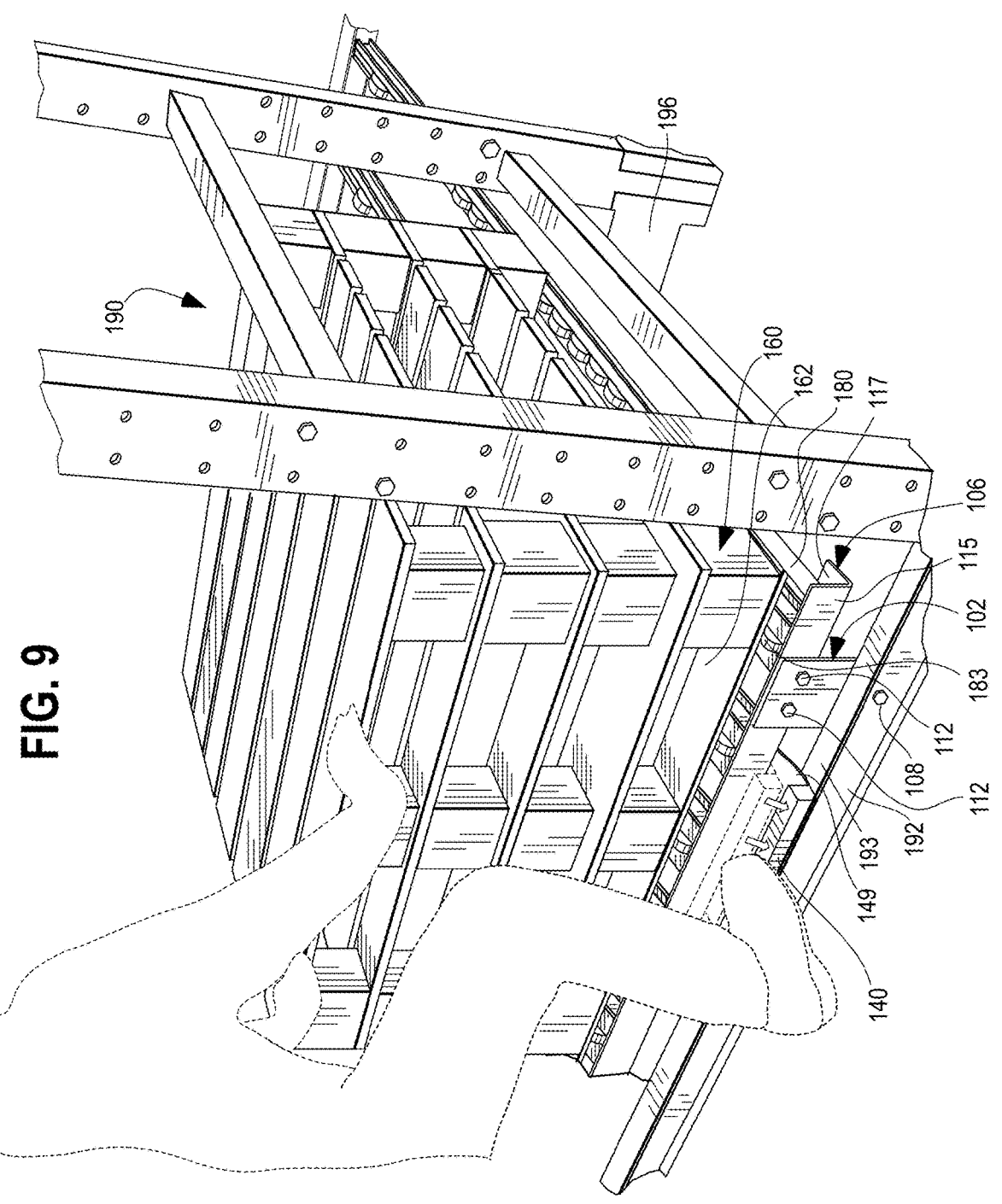
FIG. 9 is a perspective view of the pallet return assembly of FIG. 8, shown at a point in time when a foot of a worker has applied a downward force on a lever of the pallet return assembly to move the base member toward the pallet release position.

With reference to FIG. 4, when the base member 122 is in the pallet catch position, the base member 122 is positioned such that an upper portion 152 of each of the stopper members 150 extending from the base member 122 protrudes above a pallet-supporting surface 183 of the roller tracks 180 of the pallet bay 190 and catches a bottom 162 of a bottom-most pallet 160 positioned on the roller tracks 180, thereby restricting the pallet 160 from moving along the roller tracks 180 (notwithstanding the gravity-assisted tendency of the pallet 160 to move downwardly along the downwardly-sloped orientation of the roller tracks 180). With reference to FIG. 5, when the base member 122 is in the pallet release position as a result of the worker pressing down on the lever 140 (as shown in FIG. 9), the base member 122 is positioned such that the upper portion 152 of the stopper members 150 extending from the base member 122 does not protrude above (and is located below) the pallet-supporting surface 183 of the roller tracks 180 of the pallet bay 190 and no longer catches the bottom 162 of the pallet 160 positioned on the roller tracks 180 and no longer restricts the pallet 160 from moving along the roller tracks 180.

In some embodiments, each of the stopper members 150 is coupled to the base member 122 via a strengthening member 154, which reinforces the stopper members 150 and restricts the stopper members 150 from bending (e.g., due to the weight of the pallets 160 located on the roller tracks 180 that are being held in place by the upper portions 152 of the stopper members 150) relative to the base member 122. In one aspect, each strengthening member 154 has a first end 155 that is attached (e.g., welded) to the base member 122 and a second, opposite, end 157 that is attached (e.g., welded) to its respective stopper member 150. In some embodiments, the strengthening members 154 are in the form of 1 inch by 1 inch square tubing made of a metal such as steel and having a generally trapezoid shape, with the longer base side being about 3 inches and the opposite, shorter, top side being about 1.5 inches, with the base and top side being connected by congruent sides that are oriented at approximately a 45 degree angle relative to the longer base side. It will be appreciated, however, that these dimensions are provided by way of example only, and that the strengthening members 154 may have different dimensions and angular orientations in other embodiments of the pallet return assembly 100.

In some embodiments, the base member 122 is retained in the pallet catch position shown in FIG. 4 via a biasing force provided by one or more resilient members 142 located below the base member 122. In other words, the resilient members 142 are selected to have a biasing strength that is sufficient to support the weight of the base member 122 and the stopper members 150 protruding from the base member 122 and, absent the application of an external downward force (e.g., a user pressing downwardly with a foot) onto the lever 140, keep the base member 122 in a generally horizontal orientation, while keeping the stopper members 150 in the pallet catch position as shown in FIG. 4. As mentioned above, while the pallet return assembly 100 includes two resilient members 142, it will be appreciated that less than two (i.e., one) or more than two (e.g., three, four, etc.) resilient members 142 may be used in some embodiments.

In some aspects, in response to an application of a downward force (e.g., via a worker pressing down) on the lever 140, the lever 140 and the second end portion 125 of the base member 122 move downwardly from the pallet catch position of FIG. 4 toward the pallet release position of FIG. 5 while compressing the resilient members 142 from the expanded position shown in FIG. 4 to the compressed position shown in FIG. 5 against the biasing force exerted by the resilient members 142. In some embodiments, in response to a removal of the downward force from the lever 140 (i.e., when the worker removes the worker's foot from the lever 140), the lever 140 and the second end portion 125 of the base member 122 move upwardly from the pallet release position of FIG. 5 toward the pallet catch position of FIG. 4 via the biasing force exerted by the expansion of the resilient members 142 while the resilient members 142 move from the compressed position shown in FIG. 5 into the expanded position shown in FIG. 4.

Figure 8:
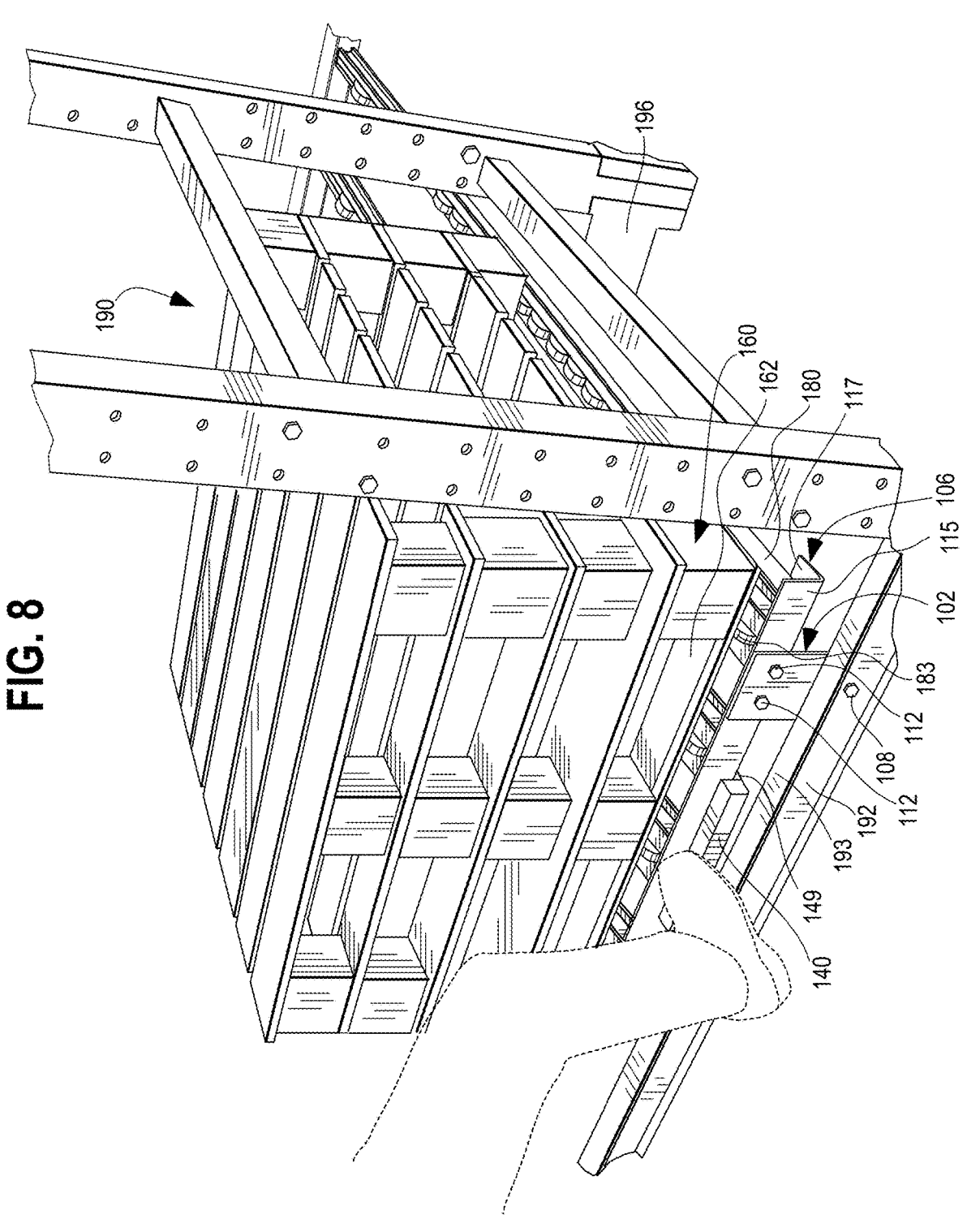
FIG. 8 is a perspective view of a pallet return assembly in accordance with an exemplary embodiment installed in a pallet bay and having four pallets stacked thereon, shown at a point in time when the base member is in the pallet catch position and prior to a foot of a worker applying a downward force on a lever of the pallet return assembly.

With reference to FIGS. 8-11, a method of using an embodiment of the exemplary pallet assembly 100 will now be described. FIG. 8 shows an embodiment of a pallet return assembly 100, which is attached to roller tracks 180 of a pallet bay 190. As mentioned above, the pallet return assembly 100 may be alternatively attached to one or more frame members (e.g., load beams or other support members) of the pallet bay 190. In the example shown in FIG. 8, the roller tracks 180 of the pallet bay 190 have four pallets 160 stacked thereon. As mentioned above, in the illustrated embodiment, five roller tracks 180 are attached to the pallet return assembly 100, and these five roller tracks 180 support the pallets 160 thereon (but it will be appreciated that the pallet bay 190 may have more than five or less than five roller tracks 180 in other implementations).

As more clearly shown in FIGS. 4 and 5, the roller tracks 180 are attached to the pallet return assembly 100 such that the horizontal portion 117 of the bracket member 106 is positioned above a top surface 193 of the first load beam 192 of the pallet bay 190 and the roller tracks 180 attached to the horizontal portion 117 of the bracket member 106 are tilted (i.e., angled to be not parallel) relative to the horizontal portion 117 of the bracket member 106. More specifically, the roller tracks 180 are attached to the horizontal portion 117 of the bracket member 106 such that the first end portion 182 of the roller tracks 180 that is attached to the horizontal portion 117 of the bracket member 106 is positioned higher than the second end portion 184 of the roller tracks 180 that is attached to a second load beam 194 of the pallet bay 190.

This so-called tilted orientation of the roller tracks 180 facilitates a "downhill" or gravity-assisted movement of a pallet 160 or a stack of pallets 160 located on the roller tracks 180 in a direction away from the first load beam 192 of the pallet bay 190 and toward the second load beam 194 of the pallet bay 190. Since four stacked pallets 160 in the example depicted in FIG. 8 may have a considerable weight, and since more than four pallets 160 may be stacked on top of the roller tracks 180 in some aspects, the tilted orientation of the roller tracks 180 of the pallet bay 190 makes it easier (and requires less effort) for a worker to push the pallets 160 along the downwardly-sloping roller tracks 180 in a direction from the first load beam 192 toward the second load beam 194, when compared to an effort that would be required to push the pallets 160 along the roller tracks 180 if the roller tracks 180 were oriented horizontally without a downward tilt.

Like FIG. 4, FIG. 8 shows the pallet return assembly 100 in the pallet catch position, where the base member 122 is positioned such that an upper portion 152 of each of the stopper members 150 extending from the base member 122 protrudes above the pallet-supporting surface 183 of the roller tracks 180 of the pallet bay 190 and catches a bottom 162 of the bottom-most pallet 160 in the stack of pallets 160 (i.e., the pallet 160 that is physically positioned on the pallet-supporting surface 183 of the roller tracks 180), thereby restricting the bottom-most pallet 160 from rolling or sliding along the pallet-supporting surface 183 of the roller tracks 180.

As mentioned above, the base member 122 may be retained in the pallet catch position shown in FIG. 8 (and also in FIG. 4) via a biasing force provided by one or more resilient members 142, which are located below the base member 122 and coupled to (e.g., wrapped around) the fasteners 137 passing through the second connecting member 130 and through the second end portion 125 of the base member 122. In some embodiments, the stopper members 150 are reinforced via strengthening members 154 that restrict the upper portions 152 of the stopper members 150 from bending due to the force applied to the upper portions 152 of the stopper members 150 by the pallets 160 located on the roller tracks 180, which, due to gravity and the downwardly-tilted orientation of the roller tracks 180, have a natural tendency to move downwardly along the roller tracks 180.

As mentioned above, the base member 122 and the stopper members 150 protruding from the base member 122 may be retained in the pallet catch position shown in FIGS. 4 and 8 via a biasing force provided by the resilient members 142 located below the base member 122. In other words, the resilient members 142 have a biasing strength that is sufficient to support the weight of the base member 122 and the stopper members 150 that protrude from the base member 122 and keep the base member 122 and the stopper members 150 in the pallet catch position. With reference to FIG. 8, when a downward force is applied to the lever 140, for example, when a worker uses the worker's foot to step on the lever 140 and push downwardly on the lever 140, the lever 140 and the second end portion 125 of the base member 122 move downwardly from the pallet catch position toward the pallet release position while compressing the resilient members 142 (see FIG. 5) against the (upwardly) biasing force exerted by the resilient members 142.

With reference to FIG. 9, when the lever 140 is pressed downwardly (e.g., by the foot of the worker) from the pallet catch position, the lever 140, the fourth connecting member 149 and the second portion 125 of the base member 122 all move downwardly (i.e., by virtue of the fourth connecting member 149 interconnecting the lever 140 and the second portion 125 of the base member 122). As the lever 140 and the base member 122 move downwardly, the stopper members 150 extending from the base member 122 also move downwardly and, when the lever 140 comes into contact with the top surface 193 of the first load beam 192 and the base member 122 reaches the pallet release position shown in FIGS. 5, 9 and 10, the upper portions 152 of the stopper members 150 do not protrude above (e.g., are located below) the pallet-supporting surface 183 of the roller tracks 180 of the pallet bay 190, and no longer catch the bottom 162 of the bottom-most pallet 160 positioned on the roller tracks 180, thereby permitting the stack of pallets 160 to move along the roller tracks 180 in response to a forward force (e.g., a push) applied to the pallets 160 by the worker (or, in some embodiments, only as a result of a gravitational downward pull).

Figure 10:
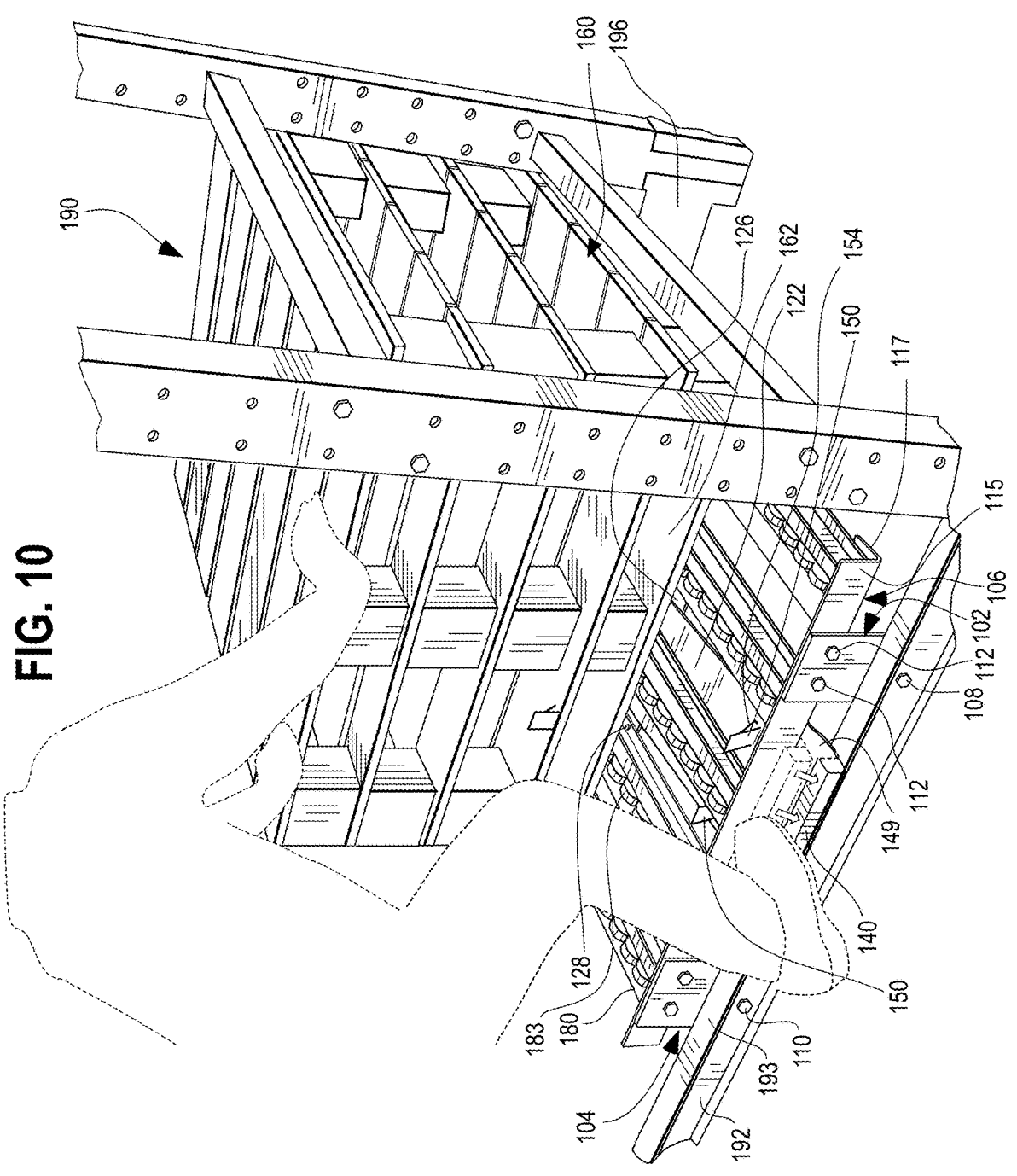
FIG. 10 is a perspective view of the pallet return assembly of FIG. 9, shown at a point in time when the base member is in the pallet release position, and the worker has pushed the pallets along the roller tracks of the pallet return assembly while still applying a downward force on a lever of the pallet return assembly.
Figure 11:
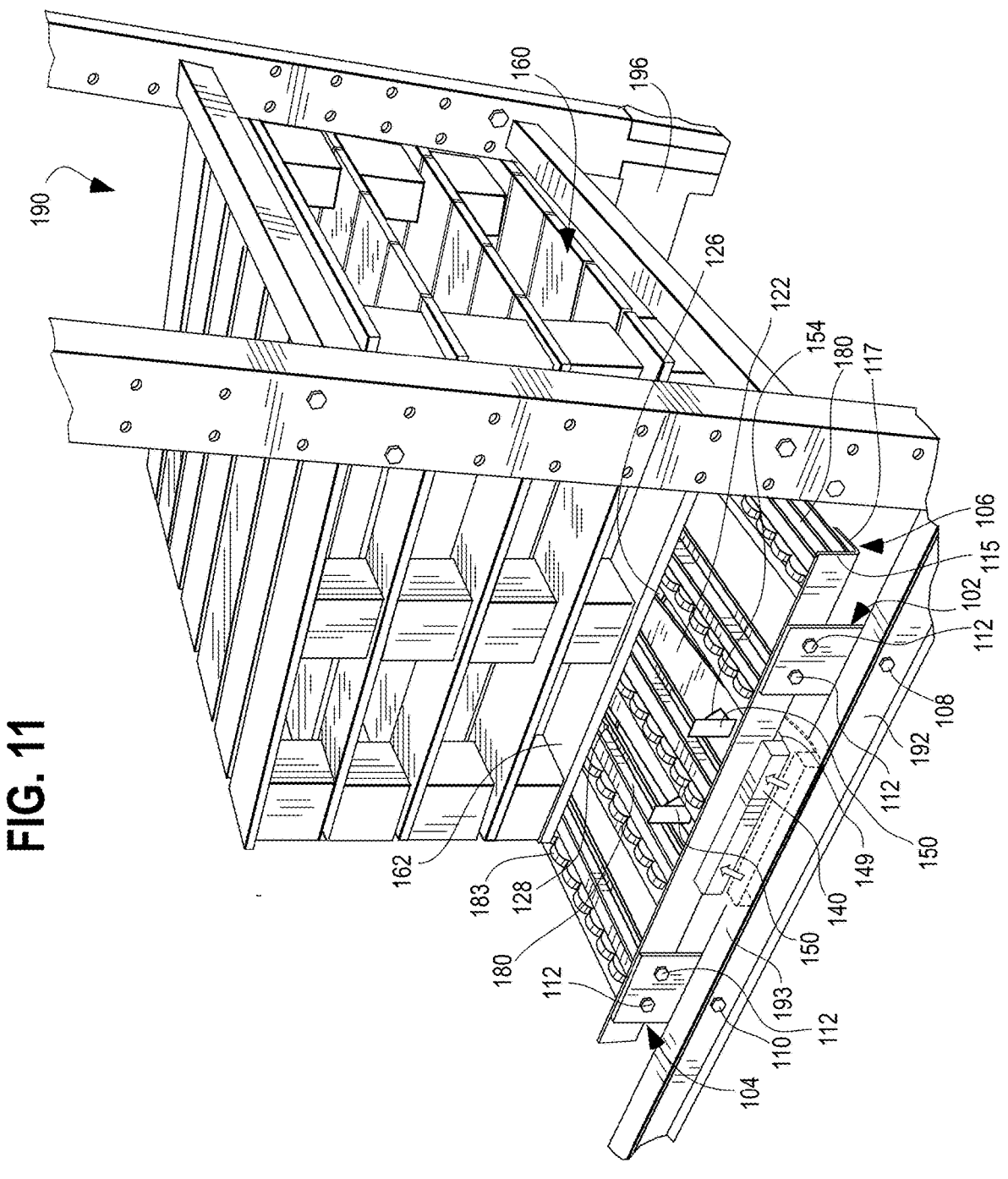
FIG. 11 is a perspective view of the pallet return assembly of FIG. 10, shown at a point in time when the foot of the worker no longer applies a downward force on the lever of the pallet return assembly such that the base member has returned into the pallet catch position.

With reference to FIG. 11, when the downward force is removed from the lever 140 (i.e., when the worker removes the worker's foot from the lever 140), the lever 140 and the second end portion 125 of the base member 122 are pushed upwardly via the upwardly biasing force exerted by the resilient members 142, and the resilient members 142 expand from the contracted position shown in FIG. 5 to the expanded position shown in FIG. 4, and move the base member 122 and the stopper members 150 upwardly from the pallet release position of FIGS. 9 and 10 back up to the pallet catch position of FIG. 5, where the upper portions 152 of the stopper members 150 extending from the base member 122 again protrude above the pallet-supporting surface 183 of the roller tracks 180 of the pallet bay 190 and catch the bottom 162 of the bottom-most pallet 160 in the next stack of pallets 160 positioned on the roller tracks 180 to restrict the bottom-most pallet 160 and thus the entire stack of pallets 160 from rolling or sliding down the roller tracks 180.

With reference to FIG. 12, an exemplary method 200 of using the pallet return assembly 100 is described. In particular, the exemplary method 200 includes applying a force to a lever 140 of the pallet return assembly 100 to a base member 122 of the pallet return assembly 100 from a pallet catch position toward a pallet release position (step 210). As discussed above, the force that is applied to the lever 140 may be a force that is exerted either by a hand or a foot (see FIG. 8) of the worker. Preferably, the force is applied to the lever 140 by a foot of the worker, since the lever 140 is located above the top surface 193 of the first load beam 192 of the pallet bay 190 at a height that makes it convenient for the worker to press the lever 140 via the worker's foot. Notably, when the force (e.g., a downward force) is applied to the lever 140 (e.g., by the worker's foot), the lever 140 and the second end portion 125 of the base member 122 move downwardly from the pallet catch position toward the pallet release position while compressing the resilient members 142 located below the base member 122 against the (upwardly) biasing force exerted by the resilient members 142.

As discussed above, when the lever 140 is in the pallet catch position as in FIG. 4, the base member 122 is positioned such that the upper portions 152 of the stopper members 150 extending from the base member 122 protrude above the pallet-supporting surface 183 of the roller tracks 180 of the pallet bay 190 and catch a bottom 162 of a bottom-most pallet 160 positioned on the roller tracks 180 and restrict the pallet 160 from moving along the roller tracks 180. Conversely, when the lever 140 is in the pallet release position as in FIGS. 5 and 9, which happens after step 210 of the method 200, the base member 122 is positioned such that the upper portions 152 of the stopper members 150 extending from the base member 122 are recessed below (and do not protrude above) the pallet-supporting surface 183 of the roller tracks 180 and no longer catch the bottom 162 of the bottom-most pallet 160 positioned on the roller tracks 180, and thus no longer restrict the pallet 160 or a stack of pallets 160 from moving along the roller tracks 180.

In the illustrated embodiment, when the lever 140 is in the pallet release position as shown in FIGS. 5 and 9, the exemplary method 200 further includes applying a force (e.g., via one or both hands of a worker as shown in FIGS. 9-10) to one or more pallets 160 located on the roller tracks 180 of the pallet bay 190, to move the stack of pallets 160 along the roller tracks 180 in a direction away from the first load beam 192 of the pallet bay 190 and toward the second load beam 194 of the pallet bay 190 (step 220). As mentioned above, in some embodiments, the roller tracks 180 are attached to the horizontal portion 117 of the bracket member 106 of the pallet return assembly 100 such that the first end portion 182 of the roller tracks 180 that is attached to the horizontal portion 117 of the bracket member 106 is positioned higher than the second end portion 184 of the roller tracks 180 that is attached to a second load beam 194 of the pallet bay 190, creating a tilted orientation of the roller tracks 180, which facilitates a "downhill" or gravity-assisted movement of the stack of pallets 160 located on the roller tracks 180 after the worker applies a forward force to the pallets 160 in step 220. As such, to move the stack of pallets 160 from the position shown in FIG. 9 to the position shown in FIG. 11, the worker is not required to exert a very strong force onto the pallets 160 (e.g., in comparison to a pallet return assembly, where the roller tracks 180 are oriented horizontally and are not in a downwardly-sloping orientation).

After the base member 122 of the pallet return assembly 100 is moved from the pallet catch position to the pallet release position in step 210, and after the pallets 160 are pushed (e.g., forwardly) by the worker in a direction away from the pallet return assembly 100 and the first load beam 192 of the pallet bay 190 and toward the second load beam 194 of the pallet bay, the exemplary method 200 further includes releasing the force applied to the lever 140 to permit the lever 140 to return to the pallet catch position, where the upper portions of the stopper members 150 extending from the base member 122 protrude above the pallet-supporting surface 183 of the roller tracks 180 (step 230). Notably, when the downward force is removed from the lever 140 (i.e., when the worker removes the worker's foot from the lever 140), the lever 140 and the second end portion 125 of the base member 122 are pushed upwardly via the upwardly biasing force exerted by the resilient members 142, and the resilient members 142 expand from the contracted position shown in FIGS. 5 and 10 to the expanded position shown in FIGS. 4 and 11, and move the lever 140 and the base member 122 and the stopper members 150 upwardly from the pallet release position back up to the pallet catch position, as shown in FIG. 11.

The above-described exemplary embodiments advantageously provide for a pallet return assembly that enables a user to easily access and actuate the lever that causes the stoppers of the plate member of the pallet return assembly to move downwardly and no longer catch the bottom of the pallets located on the roller tracks of the pallet bay, thereby permitting the pallets to be moved (e.g., pushed) along the roller tracks to the opposite side of the pallet bay, where the pallets can be picked up by a forklift. As such, the systems and methods described herein provide an easy to use pallet return device that enables workers of a product storage facility who are tasked with loading pallets into the pallet bay to be more efficient, saving the operator of the product storage facility significant operating costs.

Those skilled in the art will recognize that a wide variety of other modifications, alterations, and combinations can also be made with respect to the above-described embodiments without departing from the scope of the invention, and that such modifications, alterations, and combinations ae to be viewed as being within the ambit of the inventive concept.

What is claimed is:

1. A pallet return assembly comprising:
a first support member configured to be attached to a first load beam of a pallet bay;
a bracket member configured to be attached to the first support member and to at least one of a plurality of roller tracks of the pallet bay;
a base member including a stopper member extending generally upwardly therefrom; and a lever coupled to a portion of the base member and configured to move between a pallet catch position and a pallet release position;
wherein, when the lever is in the pallet catch position, the base member is positioned such that a portion of the stopper member extending from the base member protrudes above a pallet-supporting surface of the roller tracks of the pallet bay and catches a bottom of a pallet positioned on the roller tracks and restricts the pallet from moving along the roller tracks; and
wherein, when the lever is in the pallet release position, the base member is positioned such that the portion of the stopper member extending from the base member is positioned below the pallet-supporting surface of the roller tracks of the pallet bay and no longer catches the bottom of the pallet positioned on the roller tracks and no longer restricts the pallet from moving along the roller tracks.

2. The pallet return assembly of claim 1, further comprising a second support member configured to be attached to the first load beam of a pallet bay, wherein the bracket member is configured to be attached to the second support member and interconnect the first support member and the second support member.

3. The pallet return assembly of claim 1, wherein, when the lever is in the pallet catch position, the lever is positioned above a top surface of the first load beam of the pallet bay and at a height that permits an operator to step on the lever from above to move the lever from the pallet catch position into the pallet release position.

4. The pallet return assembly of claim 1, wherein:
the bracket member is L-shaped and has a vertical portion and a horizontal portion;
the vertical portion of the bracket member is attached to the first support member by at least one fastener; and
the horizontal portion of the bracket member is attached to at least two of the plurality of roller tracks of the pallet bay.

5. The pallet return assembly of claim 4, wherein:
the horizontal portion of the bracket member is positioned above a top surface of the first load beam of the pallet bay such that the roller tracks attached to the horizontal portion of the bracket member are tilted; and
wherein a first end portion of the roller tracks attached to the horizontal portion of the bracket member is positioned higher than a second end portion of the roller tracks that is located opposite to the first end portion of the roller tracks and attached to a second load beam of the pallet bay located opposite the first load beam of the pallet bay.

6. The pallet return assembly of claim 5, further comprising a spacer positioned below the roller tracks to support a bottom-facing surface of the roller tracks, wherein the spacer is at least in part supported by a third load beam of the pallet bay located between the first and second load beams of the pallet bay.

7. The pallet return assembly of claim 6, wherein the spacer includes at least one vertical support member coupled to a horizontal support member having a length sufficient to simultaneously support the bottom-facing surface of each of the roller tracks of the pallet bay.

8. The pallet return assembly of claim 1, wherein:
a first portion of the base member is fixedly attached to at least two of the plurality of the roller tracks of the pallet bay; and a second portion of the base member located opposite the first portion is movably coupled to the at least two of the plurality of roller tracks of the pallet bay.

9. The pallet return assembly of claim 8, wherein:

the first portion of the base member is fixedly attached to the at least two of the plurality of the roller tracks of the pallet bay via a first connecting member including at least two openings each configured to permit a fastener to pass therethrough and fixedly attach the first connecting member to the at least two of the plurality of roller tracks of the pallet bay; and the second portion of the base member is movably coupled to the at least two of the plurality of roller tracks of the pallet bay via a second connecting member including at least two openings each configured to permit a fastener to pass therethrough and fixedly attach the second connecting member to the at least two of the plurality of roller tracks of the pallet bay.

10. The pallet return assembly of claim 9, wherein the first portion of the base member overlies a portion of the first connecting member and the second portion of the base member underlies a portion of the second connecting member.

11. The pallet return assembly of claim 9, wherein the base member is retained in the pallet catch position via a biasing force provided by at least one resilient member located below the base member.

12. The pallet return assembly of claim 11, wherein, in response to an application of a downward force on the lever, the lever and the second portion of the base member moves downwardly from the pallet catch position toward the pallet release position against the biasing force exerted by the at least one resilient member; and wherein, in response to a removal of the downward force from the lever, the lever and the second portion of the base member move upwardly from the pallet release position toward the pallet catch position via the biasing force exerted by the at least one resilient member.

13. The pallet return assembly of claim 11, wherein:

the base member includes at least one opening configured to permit a fastener to pass therethrough, the fastener also passing through at least one opening in the second connecting member and through an opening in a third connecting member positioned below the base member, the fastener being fixedly attached to the third connecting member by a nut positioned below the third connecting member.

14. The pallet return assembly of claim 13, wherein the at least one resilient member is coupled to the fastener such that the at least one resilient member is permitted to compress and expand along a shaft of the fastener between the base member and the third connecting member.

15. The pallet return assembly of claim 13, wherein the second portion of the base member is attached to the lever via a fourth connecting member, and wherein the fourth connecting member partially underlies the lever and partially overlies the second portion of the base member.

16. The pallet return assembly of claim 1, wherein the stopper member is coupled to the base member via a strengthening member the restricts the stopper member from bending relative to the base member.

\* \* \* \* \*